US011420545B2

(12) United States Patent
Inoue et al.

(10) Patent No.: US 11,420,545 B2
(45) Date of Patent: Aug. 23, 2022

(54) MANUAL VALVE DEVICE

(71) Applicants: TOYOTA BOSHOKU KABUSHIKI KAISHA, Aichi-ken (JP); MIYAMA ELECTRIC CO., LTD., Tokyo (JP)

(72) Inventors: Yuya Inoue, Aichi-ken (JP); Tomochika Shibuya, Tokyo (JP)

(73) Assignees: TOYOTA BOSHOKU KABUSHIKI KAISHA, Aichi-Ken (JP); MIYAMA ELECTRIC CO., LTD., Tokyo (JP)

( * ) Notice: Subject to any disclaimer, the term of this patent is extended or adjusted under 35 U.S.C. 154(b) by 452 days.

(21) Appl. No.: 16/695,876

(22) Filed: Nov. 26, 2019

(65) Prior Publication Data

US 2020/0171989 A1 Jun. 4, 2020

(30) Foreign Application Priority Data

Nov. 29, 2018 (JP) .............................. JP2018-223204

(51) Int. Cl.
*B60N 2/66* (2006.01)
*F16K 31/05* (2006.01)
*F16K 27/00* (2006.01)

(52) U.S. Cl.
CPC ............ *B60N 2/665* (2015.04); *F16K 27/003* (2013.01); *F16K 31/05* (2013.01)

(58) Field of Classification Search
CPC ....... B60N 2/665; F16K 27/003; F16K 31/05; F16K 31/60; F16K 11/168
(Continued)

(56) References Cited

U.S. PATENT DOCUMENTS 4,633,763 A * 1/1987 Manning ................ B60N 2/914
91/530
5,082,326 A * 1/1992 Sekido ................... B60N 2/885
297/284.6
(Continued)

FOREIGN PATENT DOCUMENTS

CN 104379979 2/2015
CN 104870262 8/2015
(Continued)

OTHER PUBLICATIONS

Official Action, China Patent Office, in counterpart Chinese Patent Application No. 201911179582.3, dated Nov. 3, 2021 (with English translation).
(Continued)

*Primary Examiner* — Milton Nelson, Jr.
(74) *Attorney, Agent, or Firm* — Greenblum & Bernstein, P.L.C.

(57) ABSTRACT

A manual valve device including: a plurality of air bags provided inside a vehicle seat; a valve main body including a plurality of flow passages communicating with the plurality of air bags, respectively; a plurality of valve bodies movable inside the valve main body so as to open and close the plurality of flow passages, respectively; a plurality of valve shafts coupled to the plurality of valve bodies, respectively, and configured to be manually operated to move the plurality of valve bodies in a stroke; and an operation lever configured to press any one of the plurality of valve shafts or any combination of the plurality of valve shafts in an axial direction, in which the operation lever includes an adjustment mechanism configured to adjust an air flow rate per unit time flowing in the plurality of flow passages by changing a stroke amount in the axial direction.

5 Claims, 13 Drawing Sheets

(58) Field of Classification Search
USPC ..................................................... 297/284.6
See application file for complete search history.

(56) References Cited

U.S. PATENT DOCUMENTS

| | | | |
|---|---|---|---|
| 5,927,753 | A | 7/1999 | Faigle et al. |
| 2015/0107704 | A1 | 4/2015 | Shishido |
| 2015/0115678 | A1 | 4/2015 | Hosbach et al. |
| 2015/0329029 | A1 | 11/2015 | Akaike et al. |
| 2015/0329073 | A1 | 11/2015 | Buchholz et al. |
| 2016/0185263 | A1 | 6/2016 | Uno et al. |
| 2017/0368968 | A1 | 12/2017 | Shibata et al. |
| 2018/0156105 | A1 | 6/2018 | Igarashi |
| 2018/0201168 | A1 | 7/2018 | Wheeler |

FOREIGN PATENT DOCUMENTS

| | | | |
|---|---|---|---|
| CN | 107539181 | 1/2018 | |
| CN | 108150280 | 6/2018 | |
| DE | 198 57 919 | 7/1999 | |
| EP | 1072465 A2 * | 1/2001 | ........... B60N 2/0228 |
| EP | 1 839 932 | 10/2007 | |
| JP | 7-18506 | 3/1995 | |
| JP | 2010-235021 | 10/2010 | |
| JP | 2013-129250 | 7/2013 | |
| JP | 2016-123498 | 7/2016 | |
| WO | WO-2017011391 A1 * | 1/2017 | ............... B60N 2/02 |

OTHER PUBLICATIONS

Office Action, China Patent Office, in Chinese Patent Application No. 201911179582.3, dated May 12, 2022, (with English translation).

Office Action, Japan Patent Office, in counterpart Japan Patent Application No. 2018-223204, dated Jul. 5, 2022 (with English translation).

* cited by examiner

| | HOLD | RELEASE | UP | DOWN |
|---|---|---|---|---|
| OPERATION POSITION OF OPERATION KNOB 11 | 11(10) | 11(10) | 11(10) | 11(10) |
| ACTUATION STATE OF AIR BAG | 4a(4) ↕↔<br>4b(4) ↕↔ | 4a(4)<br>4b(4) | 4a(4) ↕↔<br>4b(4) | 4a(4)<br>4b(4) ↕↔ |

FIG.5

| OPERATION POSITION OF OPERATION KNOB 11 | AIR SUPPLY VALVE | | EXHAUST VALVE | | AIR BAG | |
|---|---|---|---|---|---|---|
| | 21A | 21B | 21C | 21D | UPPER 4a | LOWER 4b |
| HOLD | OPEN | OPEN | CLOSED | CLOSED | SUPPLY AIR | SUPPLY AIR |
| UP | OPEN | CLOSED | OPEN | CLOSED | SUPPLY AIR | EXHAUST |
| DOWN | CLOSED | OPEN | CLOSED | OPEN | EXHAUST | SUPPLY AIR |
| RELEASE | CLOSED | CLOSED | OPEN | OPEN | EXHAUST | EXHAUST |

MANUAL VALVE DEVICE

CROSS-REFERENCE TO RELATED APPLICATIONS

This application claims priority from Japanese Patent Application No. 2018-223204 filed on Nov. 29, 2018, the entire contents of which are incorporated herein by reference.

TECHNICAL FIELD

The present disclosure relates to a manual valve device.

BACKGROUND

There is a vehicle seat such as a car seat that adjusts hardness of a part abutting on a body of a seated occupant by controlling air pressure of an air bag disposed inside. An invention relating to a manual valve device for supplying or discharging air with respect to a plurality of air bags functioning as a lumbar support is disclosed in JP-A-2016-123498. In the invention, the manual valve opens and closes an air flow passage by moving a valve body which opens and closes an air flow passage in an axial direction by an operation knob that can tilt a pusher connected to the valve body in four directions of upper, lower, left, and right.

In the related art described above, operation of supplying or discharging air with respect to each of the plurality of air bags can be performed by the tilting operation of the operation knob. However, an amount per unit time of supplying or discharging air with respect to each of the plurality of air bags cannot be controlled to change a speed of inflation or contraction of each of the air bags. When the plurality of air bags are allowed to function as a lumbar support or the like, it is desired to change a state in which the body of the seated occupant is pressed by changing the speed of inflation or contraction of each of the air bags with a good sense of touch.

SUMMARY

In view of such a demand, an object of the present disclosure is to provide a manual valve with a simple structure that can change a speed at which air is supplied or discharged by opening and closing an air flow passage connected to each of the plurality of air bags.

An aspect of the present disclosure is a manual valve device including: a plurality of air bags provided inside a vehicle seat; a valve main body including a plurality of flow passages, the plurality of flow passages communicating with the plurality of air bags, respectively, so as to allow air to flow; a plurality of valve bodies movable inside the valve main body so as to open and close the plurality of flow passages, respectively; a plurality of valve shafts coupled to the plurality of valve bodies, respectively, and configured to be manually operated from an outside of the valve main body to move the plurality of valve bodies in a stroke; and an operation lever configured to press any one of the plurality of valve shafts or any combination of the plurality of valve shafts in an axial direction by being tilted with respect to the valve main body, and in which the operation lever includes an adjustment mechanism configured to adjust an air flow rate per unit time flowing in the plurality of flow passages by changing a stroke amount in the axial direction, the stroke amount being an amount in which any one of the plurality of valve shafts or any combination of the plurality of valve shafts is pressed so as to move in the stroke by tilting of the operation lever.

BRIEF DESCRIPTION OF DRAWINGS

FIG. 5 illustrates the actuation of the lumbar support;

DETAILED DESCRIPTION

Figure 1:
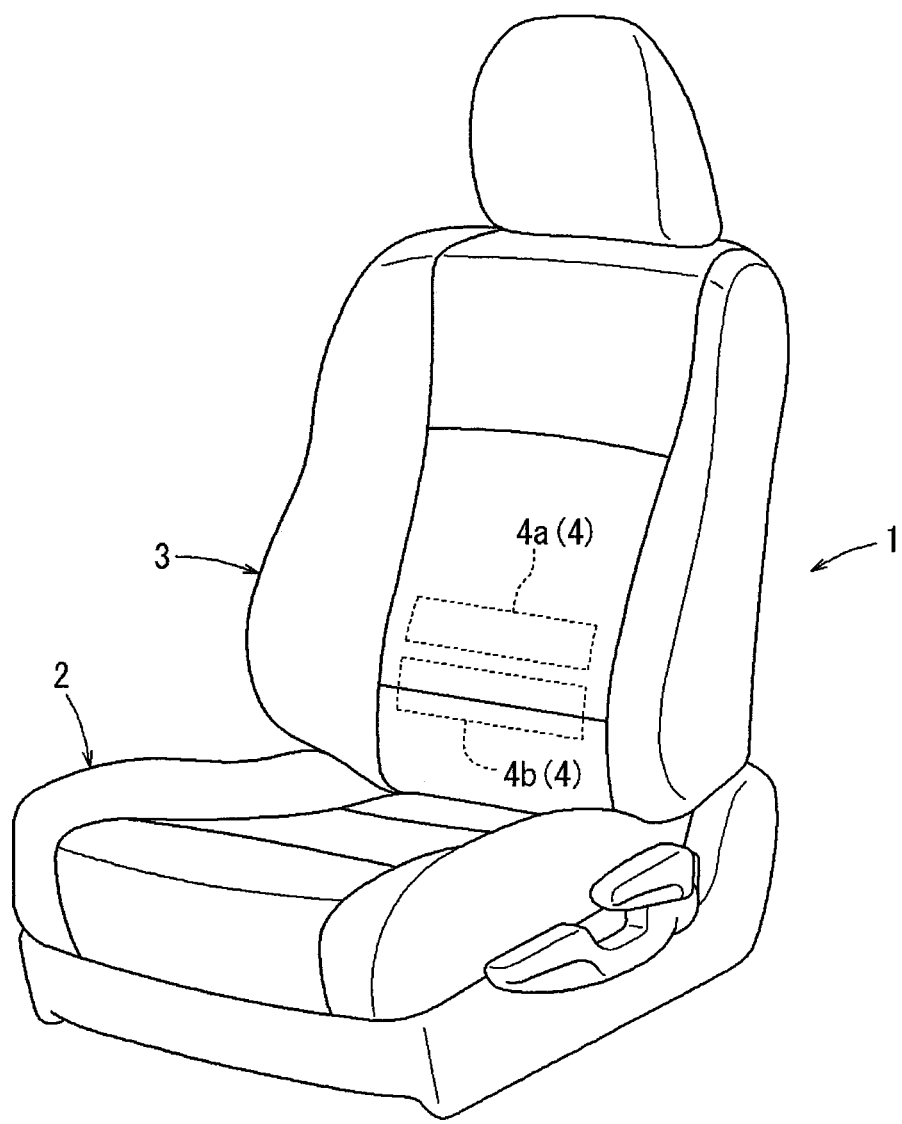
FIG. 1 is a perspective view of an automobile seat including a lumbar support to which a manual valve device of an embodiment of the present disclosure is applied.

FIG. 1 shows an automobile seat 1 including an air bag where air is supplied or discharged via a manual valve device of an embodiment of the present disclosure as a lumbar support. The automobile seat 1 includes a seat cushion 2 that supports buttocks and thighs of a seated occupant, and a seat back 3 that supports a lumbar and a back of the seated occupant. In the seat back 3, a lumbar support 4 is disposed in a part that supports the lumbar region of the seated occupant. The lumbar support 4 includes an upper air bag 4a and a lower air bag 4b which are arranged up and down. The upper air bag 4a and the lower air bag 4b have the same structure and are supplied with air separately, thereby inflating and pressing the lumbar region of the seated occupant, and the pressing is released by discharging air. Here, the automobile seat 1 corresponds to "vehicle seat" in the claims, and the upper air bag 4a and the lower air bag 4b each correspond to "air bag" in the claims.

Figures 2, 3:
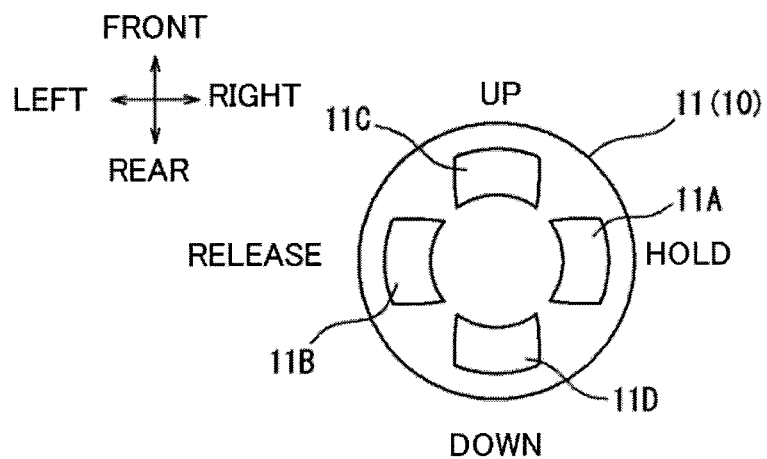
FIG. 2 illustrates operation and actuation of the lumbar support.
FIG. 3 is a plan view of an operation knob of the lumbar support.

FIG. 2 shows operation of the lumbar support 4 operated by an operation knob 11 of a manual valve device 10 of the present embodiment. The operation knob 11 controls the supply and discharge of air with respect to the upper air bag 4a and the lower air bag 4b by pushing a position indicated by a black spot and tilting in four directions of upper, lower, left, and right. In a hold mode, air is supplied to both the upper air bag 4a and the lower air bag 4b, which inflate together, and the lumbar region of the seated occupant is pressed and supported in a wide range. In a release mode, air is discharged from both the upper air bag 4a and the lower air bag 4b, which contract together, and the lumbar region of the seated occupant is not pressed. In an up mode, air is supplied to the upper air bag 4a, and air is discharged from the lower air bag 4b. Thus, the upper air bag 4a inflates and the lower air bag 4b contracts, and only a relatively high region of the lumbar region of the seated occupant is pressed and supported. In a down mode, air is supplied to the lower air bag 4b, and air is discharged from the upper air bag 4a. Thus, the lower air bag 4b inflates, the upper air bag 4a contracts, and only a relatively low region of the lumbar region of the seated occupant is pressed and supported. Details of a structure of the manual valve device 10 will be described later.

FIG. 3 shows an appearance of the operation knob 11 viewed from above. In order to realize the four modes, the operation knob 11 is attached to a case body 10B to be described later so as to be tiltable in four directions. The hold mode and the release mode are tilted in opposite directions to each other. When an operation portion 11A is pressed, the hold mode is set. When an operation portion 11B is pressed, the release mode is set. The up mode and the down mode are tilted in opposite directions to each other. When an operation portion 11C is pressed, the up mode is set. When an operation portion 11D is pressed, the down mode is set.

Figure 4:
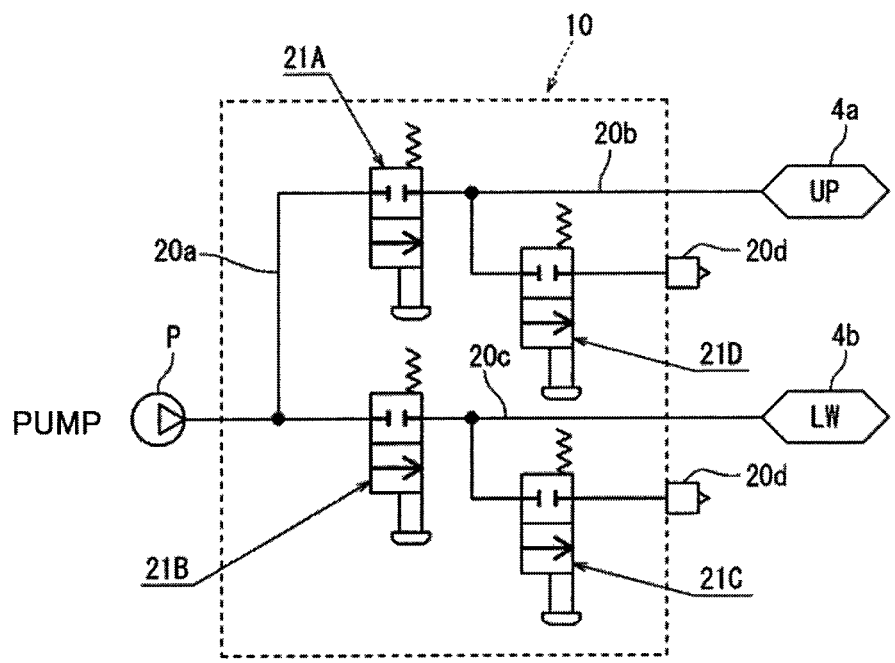
FIG. 4 is a system configuration diagram of air supply and exhaust in the lumbar support.

FIG. 4 shows a system configuration of air supply and exhaust in the lumbar support 4. The upper air bag 4a is connected to a discharge port of a pump P via a second flow passage 20b, an air supply valve 21A, and a first flow passage 20a. The upper air bag 4a is connected to an exhaust port 20d via the second flow passage 20b and an exhaust valve 21D. The lower air bag 4b is connected to a discharge port of a pump P via a third flow passage 20c, an air supply valve 21B, and the first flow passage 20a. The lower air bag 4b is connected to the exhaust port 20d via the third flow passage 20c and an exhaust valve 21C. The air supply valves 21A and 21B and the exhaust valves 21C and 21D are in an open state that allows air to flow between flow passages when the operation knob 11 is tilted, and are in a closed state that blocks air to flow between the flow passages when the operation knob 11 is not tilted. Here, the first flow passage 20a, the second flow passage 20b, the third flow passage 20c, and the exhaust port 20d each correspond to a "flow passage" in the claims.

FIG. 5 shows relationships among an operation position of the operation knob 11, the open and closed states of the air supply valves 21A and 21B and the exhaust valves 21C and 21D, and the air supply and exhaust states of the upper air bag 4a and the lower air bag 4b. When the operation knob 11 is set to the hold mode, both the air supply valves 21A and 21B are opened, and both the exhaust valves 21C and 21D are closed. Thus, air is supplied to both the upper air bag 4a and the lower air bag 4b. When the operation knob 11 is set to the release mode, both the air supply valves 21A and 21B are closed, and both the exhaust valves 21C and 21D are opened. Thus, both the upper air bag 4a and the lower air bag 4b are exhausted. When the operation knob 11 is set to the up mode, both the air supply valve 21A and the exhaust valve 21C are opened, and both the air supply valve 21B and the exhaust valve 21D are closed. Thus, the upper air bag 4a is supplied with air, and the lower air bag 4b is exhausted. When the operation knob 11 is set to the down mode, both the air supply valve 21B and the exhaust valve 21D are opened, and both the air supply valve 21A and the exhaust valve 21C are closed. Thus, the lower air bag 4b is supplied with air, and the upper air bag 4a is exhausted. At this time, a speed (flow rate per unit time) of air supply and exhaust in the hold mode and the release mode is configured to be faster (larger) than a speed (flow rate per unit time) of air supply and exhaust in the up mode and the down mode. Details thereof will be described later.

Figure 6:
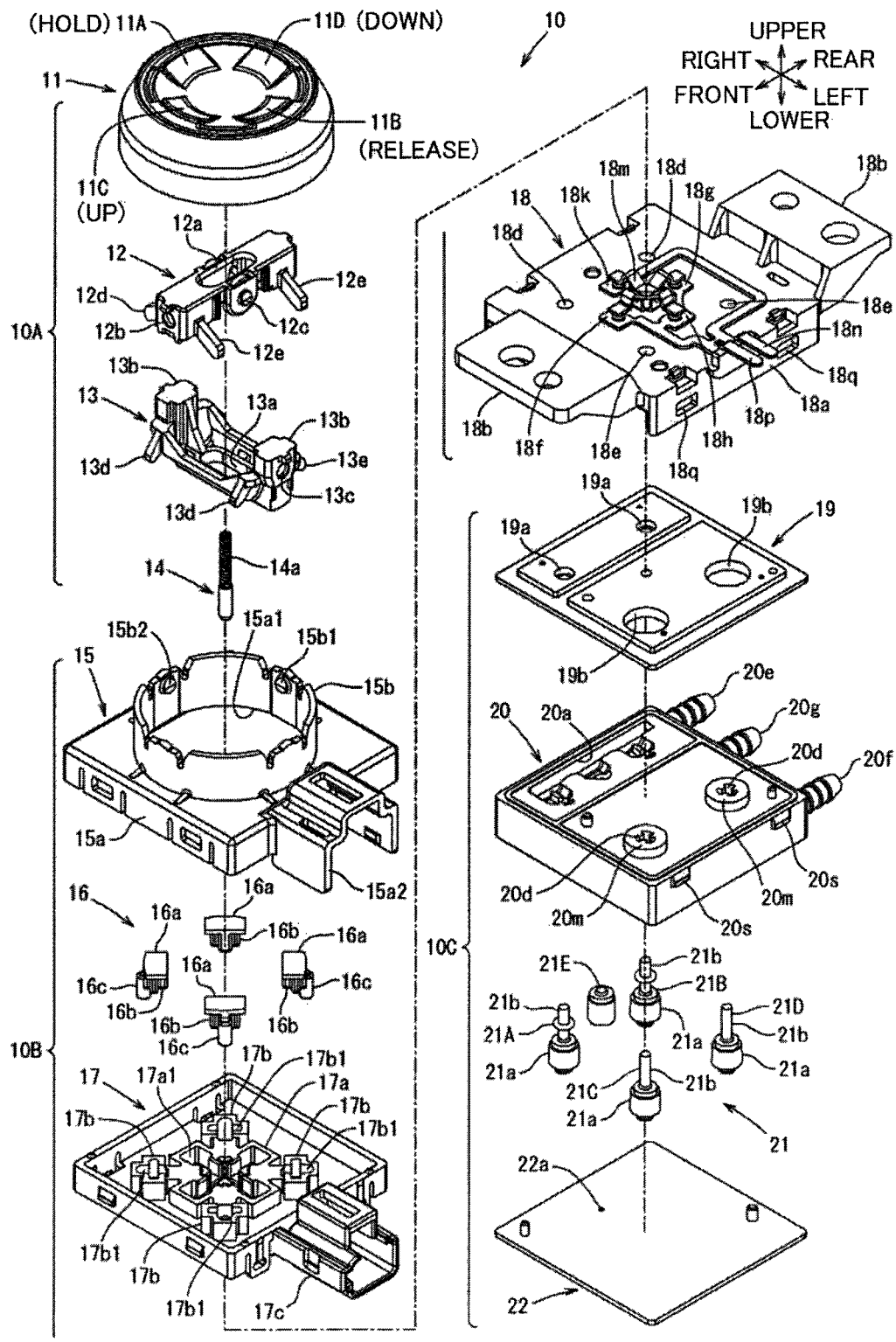
FIG. 6 is an exploded perspective view of the manual valve device viewed from obliquely above.

The manual valve device 10 is shown in FIG. 6 to FIG. 14. In each drawing, each direction of the manual valve device 10 is indicated by an arrow. Description of directions is made based on these directions in the following description. As shown in FIG. 6, the manual valve device 10 is formed by disposing and assembling an operation knob body 10A, a case body 10B, and a valve body 10C from an upper side to a lower side. The valve body 10C, the case body 10B, and the operation knob body 10A will be described in this order. Here, the operation knob body 10A corresponds to an "operation lever" in the claims.

As shown in FIG. 6 and FIG. 8 to FIG. 10, the valve body 10C has a rectangular parallelepiped shape and includes a valve body main body 20, a valve 21, an upper cover 19, and a lower cover 22. The valve body main body 20 is a plate-shaped resin molded body. The first flow passage 20a having a groove shape and the exhaust port 20d are formed on an upper surface side of the valve body main body 20, and the second flow passage 20b and the third flow passage 20c are formed on a lower surface side of the valve body main body 20. A part where the exhaust port 20d is formed is formed as a protruding portion 20m whose upper portion protrudes upward in a cylindrical shape. The air supply valve 21A that opens and closes between the first flow passage 20a and the second flow passage 20b is disposed in the vicinity of a front right corner portion of the valve body main body 20. The air supply valve 21B that opens and closes between the first flow passage 20a and the third flow passage 20c is disposed in the vicinity of a rear right corner portion of the valve body main body 20. The exhaust valve 21C that opens and closes between the third flow passage 20c and the exhaust port 20d is disposed in the vicinity of a front left corner portion of the valve body main body 20. The exhaust valve 21D that opens and closes between the second flow passage 20b and the exhaust port 20d is disposed in the vicinity of a rear left corner portion of the valve body main body 20. The valve body main body 20 is covered with an upper cover 19 from above and a lower cover 22 from below, so that upper or lower openings of grooves of the first flow passage 20a, the second flow passage 20b, and the third flow passage 20c are blocked. Specifically, the upper cover 19 is provided with through-holes 19a penetrating positions corresponding to the air supply valves 21A and 21B in an upper-lower direction and through-holes 19b passing the protruding portions 20m through positions corresponding to the exhaust valves 21C and 21D. The lower cover 22 is provided with a through-hole 22a penetrating a position corresponding to an adjustment valve 21E to be described later in the upper-lower direction. A hose joint 20e that connects the other end of a hose (not shown) whose one end is connected to the discharge port of the pump P is provided at a rear side end of the first flow passage 20a. A hose joint 20f that connects the other end of a hose (not shown) whose one end is connected to the upper air bag 4a is provided at a rear side end of the second flow passage 20b. A hose joint 20g that connects the other end of a hose (not shown) whose one end is connected to the lower air bag 4b is provided at a rear side end of the third flow passage 20c. Here, the valve body main body 20, the upper cover 19, and the lower cover 22 correspond to a "valve main body" in the claims. The valve body main body 20 corresponds to a "base body" in the claims, and the upper cover 19 and the lower cover 22 each correspond to a "cover" in the claims.

Figure 11:
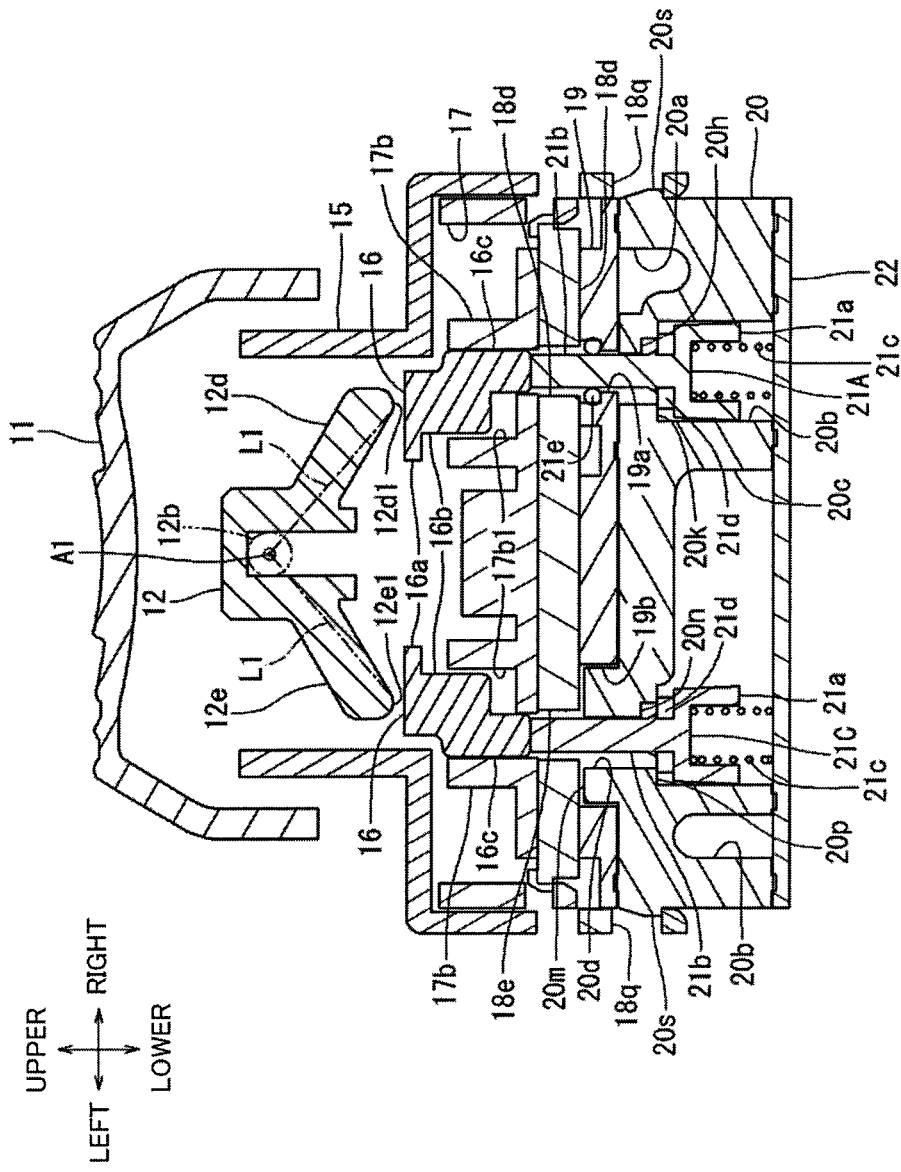
FIG. 11 is a sectional view taken along a line XI-XI in FIG. 7.
Figure 12:
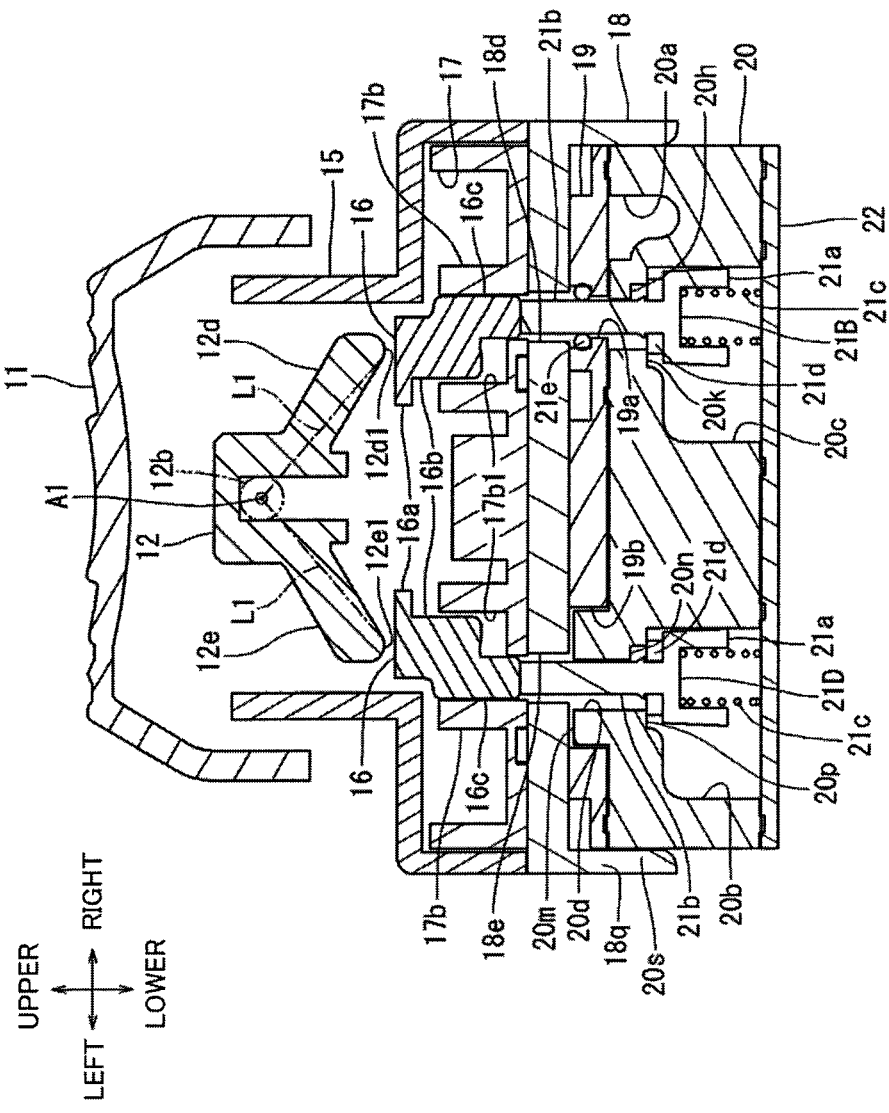
FIG. 12 is a sectional view taken along a line XII-XII in FIG. 7.

As shown in FIG. 6, FIG. 11, and FIG. 12, the air supply valves 21A and 21B and the exhaust valves 21C and 21D have the same shape and include a cup-shaped valve base portion 21a opening downward and a valve shaft portion 21b coupled to an upper surface portion of the valve base portion 21a in a shaft shape. The valve base portion 21a is disposed in a cavity that forms the second flow passage 20b or the third flow passage 20c. A compression coil spring 21c is disposed between the valve base portion 21a and the lower cover 22 that covers the cavity from below. Thus, the air supply valves 21A and 21B and the exhaust valves 21C and 21D are biased upward. Here, the valve base portion 21a and the valve shaft portion 21b correspond to a "valve body" and a "valve shaft" in the claims, respectively.

Figure 8:
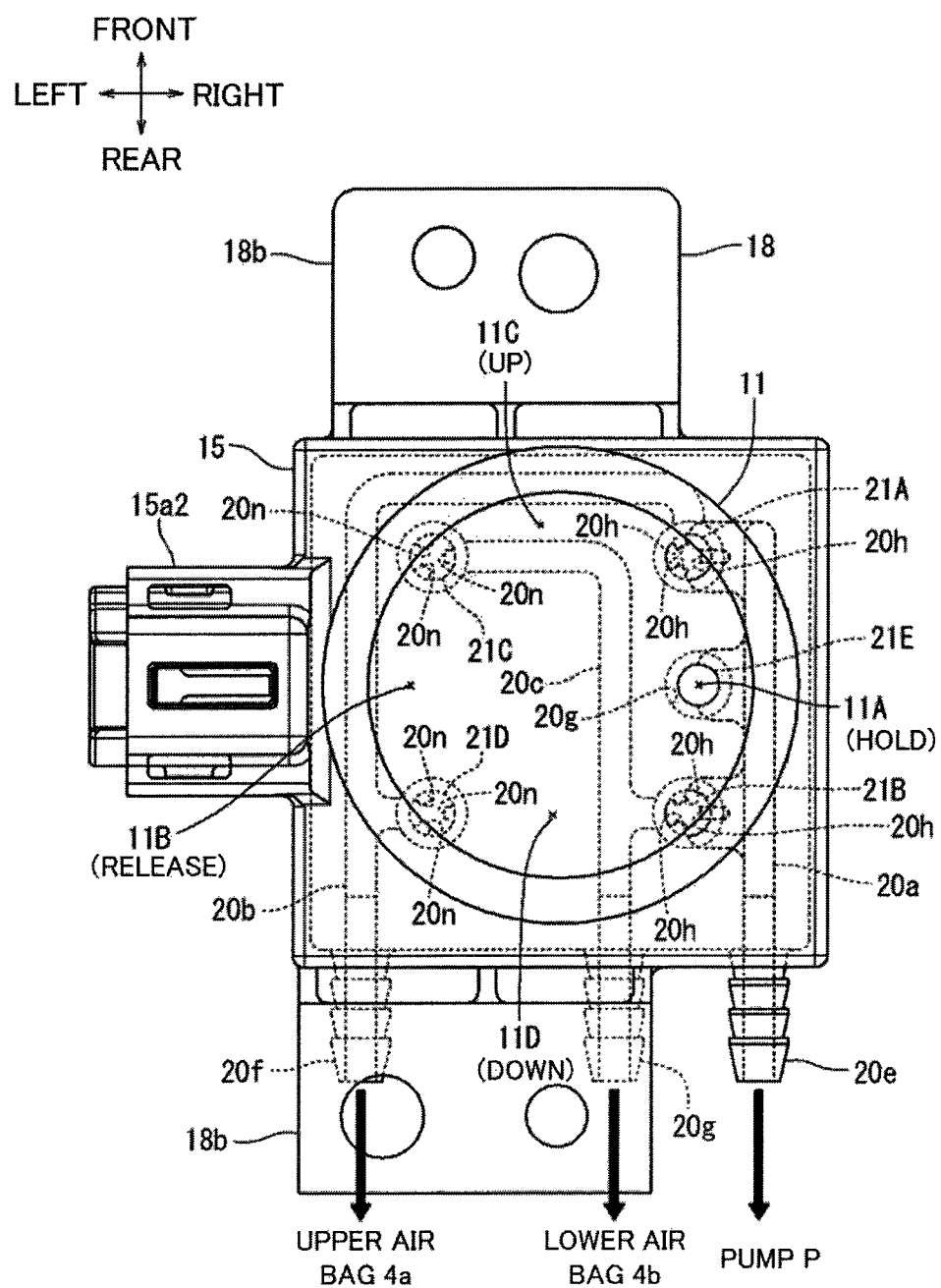
FIG. 8 is a plan view of the manual valve device viewed from above, where a flow passage of a valve main body is indicated by broken lines.

As shown in FIG. 8, FIG. 11, and FIG. 12, a support body 20h is provided at a position crossing the first flow passage 20a in a part where the air supply valves 21A and 21B of the first flow passage 20a are disposed. The support body 20h supports the valve shaft portion 21b from a circumference of the valve shaft portion 21b in an axial direction, and prevents the valve shaft portion 21b from moving in a direction other than the axial direction. The three support bodies 20h are disposed at equal intervals around the axis of the valve shaft portion 21b. A sealing surface portion 20k is provided on an upper surface of a part where the air supply valve 21A of the second flow passage 20b is disposed, and is provided on an upper surface of a part where the air supply valve 21B of the third flow passage 20c is disposed. A packing 21d is interposed between the valve base portion 21a and the sealing surface portion 20k. An upper end side of the valve shaft portion 21b protrudes upward through the through-hole 19a of the upper cover 19, and is disposed such that an upper end of the valve shaft portion 21b is pressed by a pusher 16 to be described later. An O-ring 21e is disposed between an inner peripheral portion of the through-hole 19a and the valve shaft portion 21b so that air in the first flow passage 20a does not leak from the upper cover 19. Thus, when the valve shaft portion 21b is not pressed by the pusher 16, the first flow passage 20a and the second flow passage 20b are closed by the air supply valve 21A, and the first flow passage 20a and the third flow passage 20c are closed by the air supply valve 21B. Further, when the valve shaft portion 21b is not pressed by the pusher 16, the first flow passage 20a and the second flow passage 20b are opened by the air supply valve 21A, and the first flow passage 20a and the third flow passage 20c are opened by the air supply valve 21B. The open state changes so as to increase a flow passage cross-section in accordance with a pressing amount of the valve shaft portion 21b. That is, as a stroke amount of the valve shaft portion 21b increases, in other words, as a pressing speed increases, an air flow rate per unit time increases.

As shown in FIG. 8, FIG. 11, and FIG. 12, a support body 20n is provided at a position crossing the exhaust port 20d in a part where the exhaust valves 21C and 21D of the exhaust port 20d are disposed. The support body 20n supports the valve shaft portion 21b from the circumference of the valve shaft portion 21b in an axial direction, and prevents the valve shaft portion 21b from moving in a direction other than the axial direction. The three support bodies 20n are disposed at equal intervals around the axis of the valve shaft portion 21b. A sealing surface portion 20p is provided on an upper surface of a part where the exhaust valve 21C of the third flow passage 20c is disposed, and is provided on an upper surface of a part where the exhaust valve 21D of the second flow passage 20b is disposed. The packing 21d is interposed between the valve base portion 21a and the sealing surface portion 20p. An upper end side of the valve shaft portion 21b protrudes upward through the exhaust port 20d of the protruding portion 20m, and is disposed such that an upper end of the valve shaft portion 21b is pressed by a pusher 16 to be described later. Thus, when the valve shaft portion 21b is not pressed by the pusher 16, the third flow passage 20c and the exhaust port 20d are closed by the exhaust valve 21C, and the second flow passage 20b and the exhaust port 20d are closed by the exhaust valve 21D. Further, when the valve shaft portion 21b is not pressed by the pusher 16, the third flow passage 20c and the exhaust port 20d are opened by the exhaust valve 21C, and the second flow passage 20b and the exhaust port 20d are opened by the exhaust valve 21D. The open state changes so as to increase a flow passage cross-section in accordance with a pressing amount of the valve shaft portion 21b. That is, as a stroke amount of the valve shaft portion 21b increases, in other words, as a pressing speed increases, an air flow rate per unit time increases.

Figure 10:
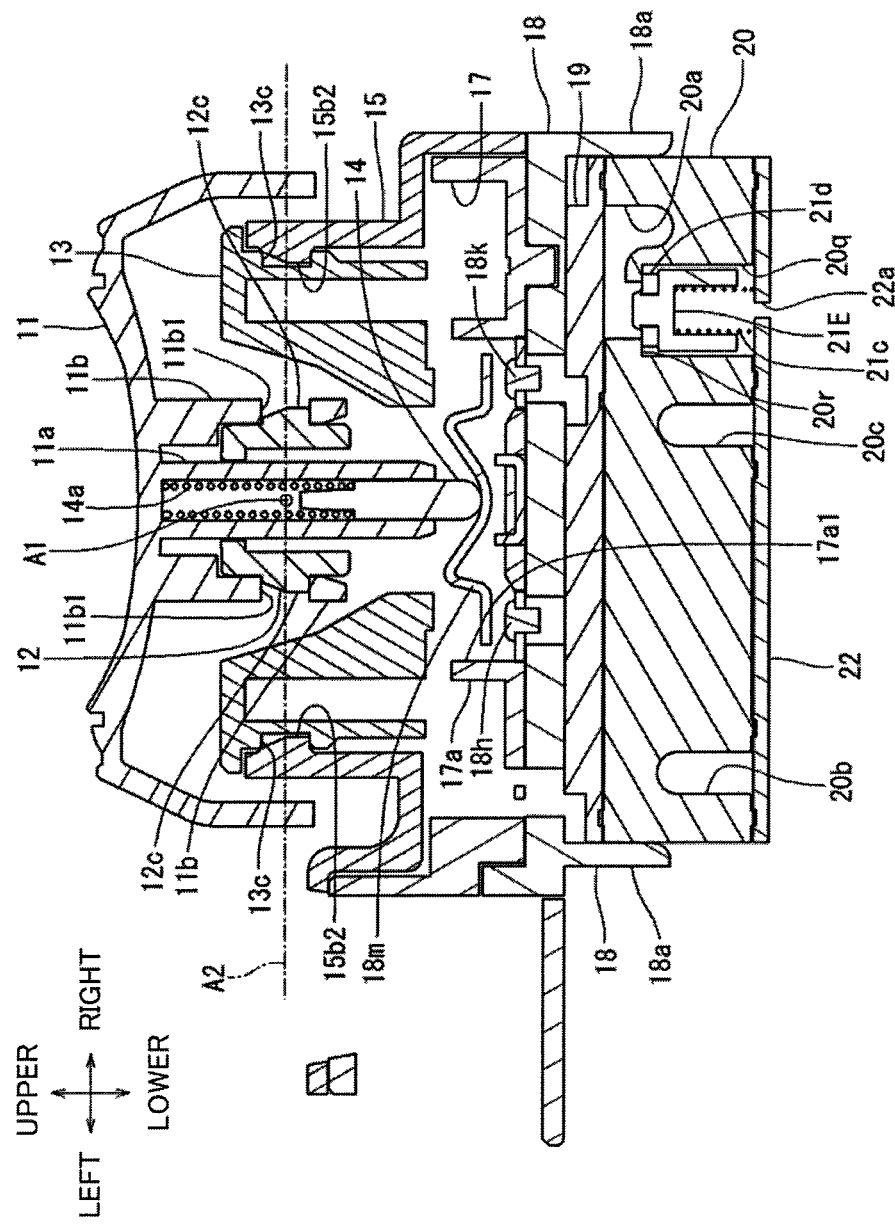
FIG. 10 is a sectional view taken along a line X-X in FIG. 7.

As shown in FIG. 8 and FIG. 10, a cylindrical adjustment hole 20q that opens downward is provided in a central portion, in a front-rear direction, of the first flow passage 20a inside the valve body main body 20. The through-hole 22a is located in a part corresponding to the adjustment hole 20q of the lower cover 22. The cup-shaped adjustment valve 21E that opens downward is disposed in the adjustment hole 20q in a state of being biased upward by the compression coil spring 21c disposed between the adjustment hole 20q and the lower cover 22. A sealing surface portion 20r is provided on an upper surface of the adjustment hole 20q. The packing 21d is interposed between the upper surface of the adjustment valve 21E and the sealing surface portion 20r. Thus, when pressure of air in the first flow passage 20a exceeds a predetermined value, the adjustment valve 21E moves downward to be open, and the air escapes to fulfill a function of adjusting the air pressure.

Figure 9:
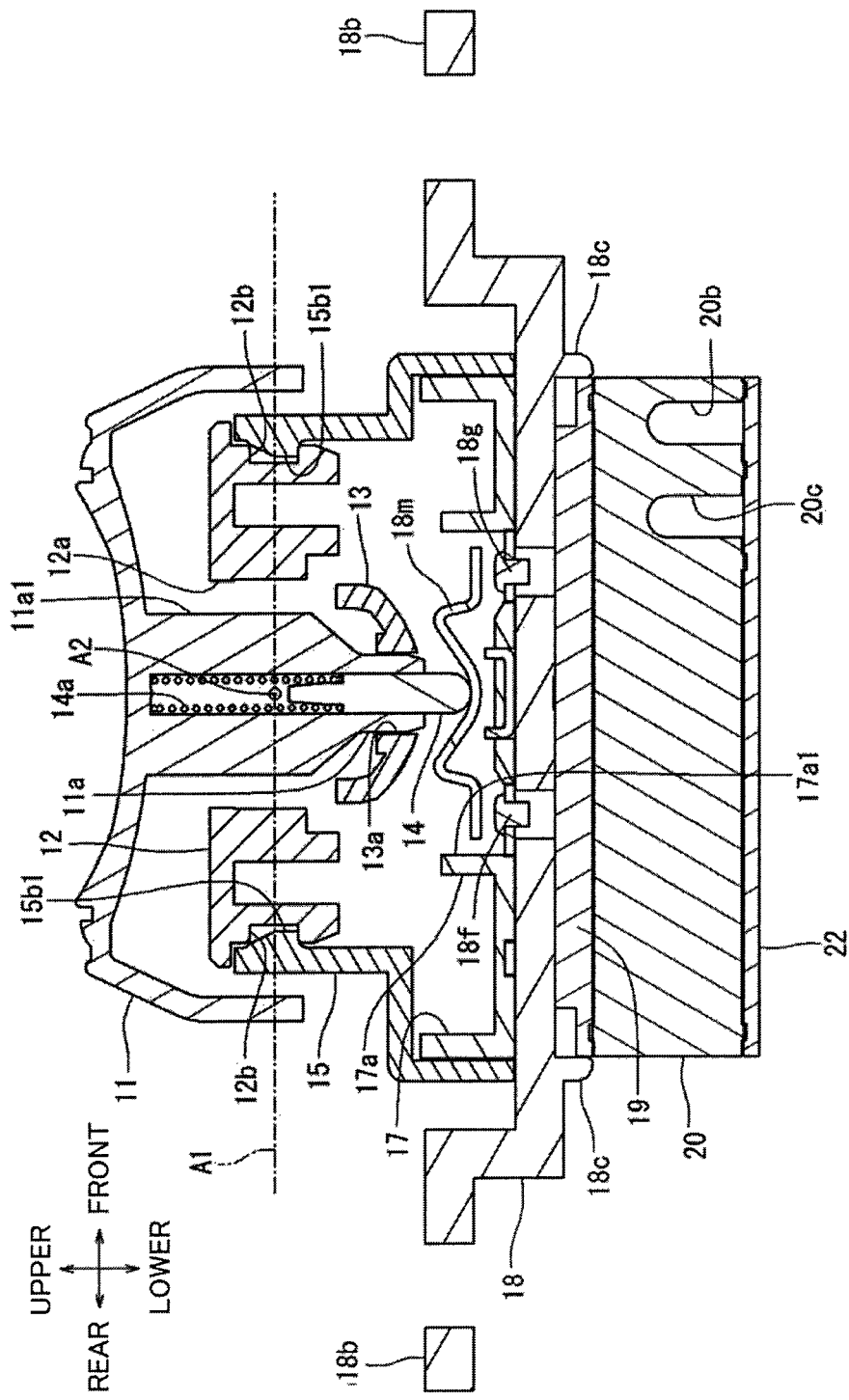
FIG. 9 is a sectional view taken along a line IX-IX in FIG. 7.

As shown in FIG. 6, FIG. 9, and FIG. 10, the case body 10B is attached so as to cover the valve body 10C from above. The case body 10B includes a first case 15, a second case 17, a third case 18, and four pushers 16 disposed to be movable up and down with respect to the second case 17 from the upper side to the lower side.

The first case 15 includes a resin box-shaped main body portion 15a having a substantially square shape in a top view with an opening below and a cylindrical portion 15b extending in the upper-lower direction attached to the upper surface portion of the main body portion 15a. A central axis of the main body portion 15a coincides with a central axis of the cylindrical portion 15b in the top view, and extends in the upper-lower direction. A through-hole is provided in an inner cylinder portion of the cylindrical portion 15b on an upper surface portion of the main body portion 15a. A connector attachment portion 15a2 protrudes leftward and is provided on a left surface portion of the main body portion 15a. A cylindrical projecting portion 15b1 extending to face front and rear sides and be close to each other and a cylindrical projecting portion 15b2 extending to face left and right sides and be close to each other are provided on an inner cylindrical surface near an upper end of the cylindrical portion 15b. The projecting portion 15b1 swingably supports a first swing member 12 to be described later on the cylindrical portion 15b, and the projecting portion 15b2 swingably supports a second swing member 13 to be described later on the cylindrical portion 15b.

The second case 17 is a resin box-shaped member having a substantially square shape in a top view with an opening above, and is attached by covering the main body portion 15a of the first case 15 outside. One cross-shaped wall portion 17a extending upward and four pusher supporting walls 17b supporting a pusher 16 that will be described later to be vertically movable and extending upward are provided on a lower surface portion of the second case 17. The cross-shaped wall portion 17a has a through-hole 17a1 extending in the upper-lower direction in a cross shape extending back and forth and left and right about a central axis of the second case 17 in the top view. A pressing shaft 14 of an operation knob body 10A to be described later can swing up and down or right and left in the through-hole 17a1. The pusher supporting wall 17b is disposed at a position equidistant from the central axis by two on a diagonal line in the top view of a lower surface portion of the second case 17, and has a through-hole 17b1 extending in the upper-lower direction. The through-hole 17b1 has a cross shape extending in a radial direction about the central axis of the second case 17 in the top view and in a direction perpendicular to the radial direction. A sliding portion 16b of the pusher 16 to be described later can slide up and down in the through-hole 17b1. Details of the position where the pusher supporting wall 17b is disposed will be described later. A connector attachment portion 17c is provided on a left surface portion of the second case 17 and protrudes leftward.

Figure 7:
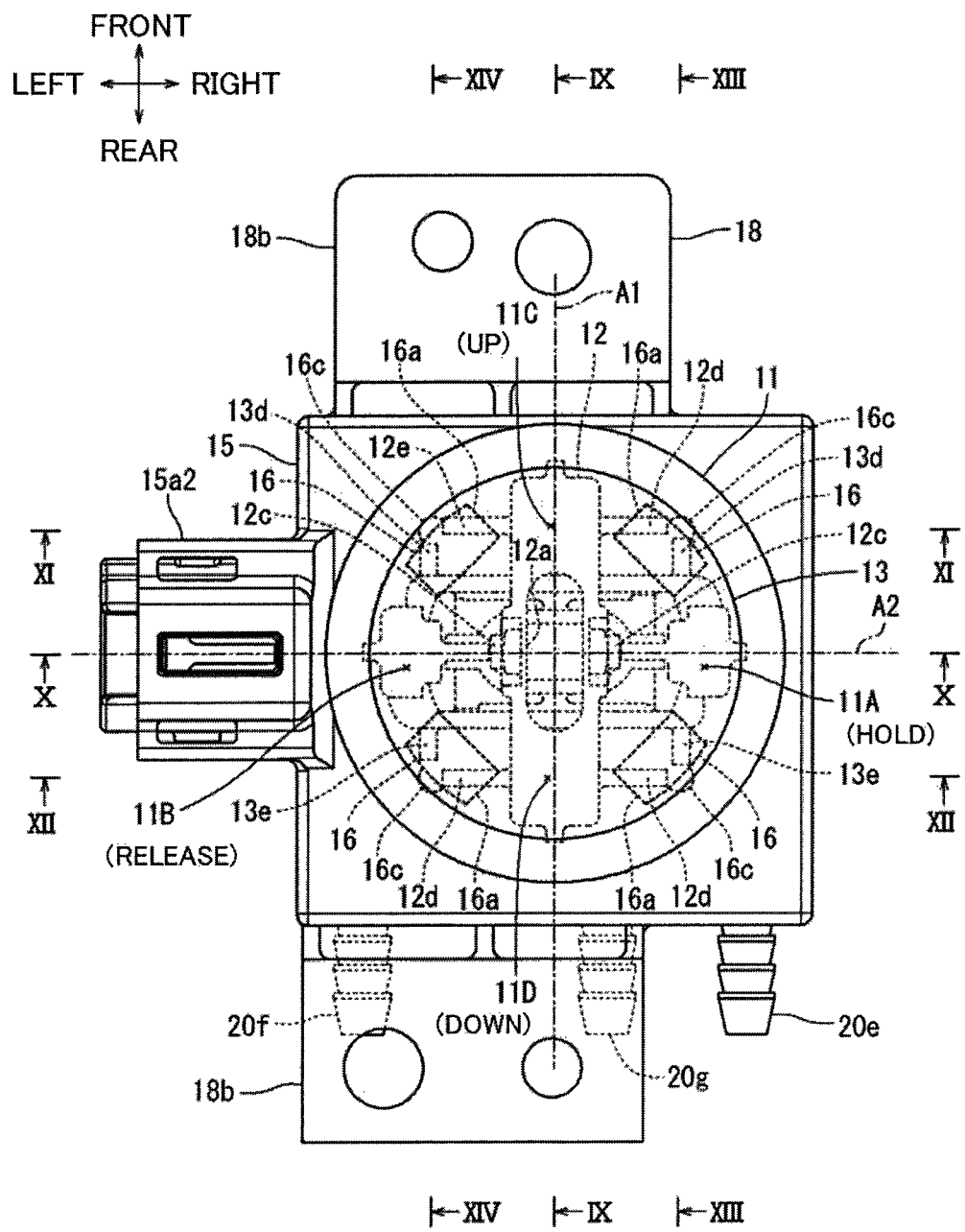
FIG. 7 is a plan view of the manual valve device viewed from above, where a first swing member 12, a second swing member 13, and a pusher 16 are indicated by broken lines.

As shown in FIG. 6, FIG. 7, and FIG. 11, the pusher 16 is a resin member, and includes a top plate portion 16a, a sliding portion 16b, and a pressing portion 16c that abuts on the valve shaft portion 21b protruding to an upper portion of the valve body 10C and presses the valve shaft portion 21b downward. The sliding portion 16b has a cross-section of a cross shape and is formed to be slidable in the upper-lower direction with respect to the pusher supporting wall 17b in the through-hole 17b1 of the second case 17. The top plate portion 16a is connected to an upper end of the sliding portion 16b perpendicularly to an extending direction of the sliding portion 16b, and is formed in a substantially rectangular shape in a top view. The top plate portion 16a is disposed so that a long side of the top plate portion 16a is substantially along a circumference about the central axis of the second case 17 in the top view. In the sliding portion 16b, a cylindrical pressing portion 16c extending in the upper-lower direction is provided at a part farthest from the central axis of the second case 17 in the top view. A lower end of the pressing portion 16c abuts on the upper end of the valve shaft portion 21b of the air supply valves 21A and 21B protruding upward through a through-hole 18d of a third case 18 to be described later and the upper end of the valve shaft portion 21b of the exhaust valves 21C and 21D protruding upward through the through-hole 18e. The sliding portion 16b and an outer circumferential wall surface of the through-hole 17b1 of and the second case 17 are subjected to flat knurling along the upper-lower direction, and the pusher 16 is prevented from moving in a direction other than the upper-lower direction.

The third case 18 is a resin plate-shaped member having a substantially square shape in a top view. The third case 18 is provided with an upright wall portion 18a extending downward at left and right ends of the third case 18, and is provided with an attachment portion 18b extending outward at front and rear ends of the third case 18. When the third case 18 is attached by covering the valve body 10C, an inner side surface of the upright wall portion 18a abuts on left and right outer surfaces of the valve body 10C to stop movement in the left-right direction. As shown in FIG. 9, a pair of front and rear positioning projecting portions 18c extending downward are provided on a lower surface of the third case 18. When the third case 18 is attached by covering the valve body 10C, an inner side surface of the positioning projecting portion 18c abuts on front and rear outer surfaces of the valve body 10C to stop movement in the front-rear direction. The attachment portion 18b is a part for fixing the manual valve device 10 to a predetermined place of a vehicle body. The third case 18 is provided with two cylindrical through-holes 18d corresponding to the two through-holes 19a of the valve body 10C. A diameter of the through-hole 18d is set to be slightly larger than a diameter of the pressing portion 16c of the pusher 16. With the third case 18 attached to the valve body 10C, the upper ends of the valve shaft portions 21b of the air supply valves 21A and 21B protrude from an upper surface of the third case 18 through the through-holes 18d. The third case 18 is provided with two cylindrical through-holes 18e corresponding to the two exhaust ports 20d of the valve body 10C. The diameter of the through-hole 18 e is set to be slightly larger than the diameter of the pressing portion 16c of the pusher 16. With the third case 18 attached to the valve body 10C, the upper ends of the valve shaft portions 21b of the exhaust valves 21C and 21D protrude from an upper surface of the third case 18 through the through-holes 18e.

As shown in FIG. 6, FIG. 9, and FIG. 10, electrical wiring made of a metal plate is provided on the upper surface of the third case 18. Specifically, a front contact 18f on a front side, a rear contact 18g on a rear side, a left contact 18h on a left side, and a right contact 18k on a right side at apex parts of a cross extending back and forth and left and right about a central axis of the third case 18 in the top view are provided on the upper surface of the third case 18. Further, a spring contact 18m that is supported by a central part of the cross and positioned such that each apex part of the cross is separated above each of the contacts 18f, 18g, 18h, and 18k is disposed on the upper surface of the third case 18. The right contact 18k and the spring contact 18m are connected to a power source +B via first wiring 18n, and the front contact 18f, the rear contact 18g, and the left contact 18h are connected to a positive electrode terminal of the pump P via second wiring 18p. When an operation knob body 10A to be described later is tilted, the spring contact 18m is deformed such that the apex parts of the cross is pushed down by the pressing shaft 14, and is in contact with each of the contacts 18f, 18g, 18h, and 18k. When the spring contact 18m comes into contact with the front contact 18f, the rear contact 18g, or the left contact 18h, the first wiring 18n and the second wiring 18p are connected to actuate the pump P to supply air. When the spring contact 18m comes into contact with the right contact 18k, the first wiring 18n and the second wiring 18p are not connected, and the pump P is not actuated. In the top view, an edge shape of the through-hole 17a1 of the second case 17 substantially coincides with an outer edge shape of the spring contact 18m.

As shown in FIG. 6, and FIG. 9 to FIG. 14, the operation knob body 10A is attached so as to cover the cylindrical portion 15b of the case body 10B. The operation knob body 10A includes the operation knob 11, the first swing member 12, the second swing member 13, and the pressing shaft 14 attached to the operation knob 11 from the upper side to the lower side. Here, each of the first swing member 12 and the second swing member 13 corresponds to an "adjustment mechanism" in the claims.

The operation knob 11 is a cup-shaped resin member in a round shape in a top view with an opening downward. A cylindrical pressing shaft supporting portion 11a having a central axis that coincides with the central axis of the operation knob 11 extends downward and is disposed on a lower surface of the operation knob 11. An inner cylinder diameter of the pressing shaft supporting portion 11a is set to be slightly larger than the pressing shaft 14, and the pressing shaft 14 is inserted into the inner cylinder of the pressing shaft supporting portion 11a from below via a compression coil spring 14a. Thus, the pressing shaft 14 slides up and down in the inner cylinder of the pressing shaft supporting portion 11a when receiving a biasing force downward from the operation knob 11. A radially extending rib 11a1 is provided between the lower surface of the operation knob 11 and the pressing shaft supporting portion 11a on front and rear sides of an outer cylindrical portion of the pressing shaft supporting portion 11a. A pair of first swing member supporting walls 11b separated from the pressing shaft supporting portion 11a in the right and left radial directions and extending downward are provided on the lower surface of the operation knob 11. The pair of first swing member supporting walls 11b face each other and extend in parallel to each other in the front-rear direction, and an interval in the left-right direction is slightly larger than a length of the first swing member 12 in the left-right direction. Through-holes 11b1 facing each other and penetrating in the left-right direction are provided in the pair of first swing member supporting walls 11b, and projecting portions 12c of the first swing members 12 to be described later are inserted into the through-holes 11b1. Thus, the operation knob 11 is swingable in the front-rear direction about a swing axis A2 to be described later with respect to the first swing member 12.

As shown in FIG. 6 and FIG. 9 to FIG. 12, the first swing member 12 is a box-shaped resin member having a rectangular shape in a top view with an opening downward. A long hole 12a having a long axis in the front-rear direction is provided at a central portion of the upper surface portion. A through-hole 12b penetrating in the front-rear direction is provided on the front surface portion and the rear surface portion. The projecting portion 12c protruding outward in an out-of-plane direction is provided at a central portion in the front-rear direction of a right surface portion and a left surface portion. A pusher pressing portion 12d extending obliquely toward a right lower side is provided on a front side and a rear side of the right surface portion, and a pusher pressing portion 12e extending obliquely toward a left lower side is provided on a front side and a rear side of the left surface portion. The first swing member 12 is attached to the cylindrical portion 15b of the case body 10B so as to insert the pair of projecting portions 15b1 of the cylindrical portion 15b into the pair of through-holes 12b, so that the first swing member 12 can swing about a swing axis A1 in the left-right direction. The swing shaft A1 is a shaft extending in the front-rear direction common to the pair of projecting portions 15b1 and the pair of through-holes 12b. The first swing member 12 is assembled to the first swing member supporting wall 11b of the operation knob 11 so as to insert the pair of projecting portions 12c into the pair of through-holes 11b1. Thus, when the pressing shaft supporting portion 11a is passed from above into the long hole 12a of the first swing member 12 and assembled, the operation knob 11 can swing in the front-rear direction with respect to the first swing member 12. The operation knob 11 can swing in the left-right direction with respect to the cylindrical portion 15b of the case body 10B about the swing axis A1 together with the first swing member 12. Here, the swing axis A1 corresponds to a "rotation axis and first rotation axis" in the claims.

As shown in FIG. 7, FIG. 11, and FIG. 12, when the first swing member 12 is attached to the case body 10B, the pusher pressing portion 12d extends toward the top plate portion 16a of the pusher 16 corresponding to the valve shaft portion 21b of the air supply valves 21A and 21B. A distance between the swing axis A1 and a lowest point 12d1 of the pusher pressing portion 12d viewed from the front is L1. Similarly, when the first swing member 12 is attached to the case body 10B, the pusher pressing portion 12e extends toward the top plate portion 16a of the pusher 16 corresponding to the valve shaft portion 21b of the exhaust valves 21C and 21D. A distance between the swing axis A1 and a lowest point 12e1 of the pusher pressing portion 12e viewed from the front is L1. Here, the lowest point 12d1 and the lowest point 12e1 each correspond to an "abutment point" in the claims.

As shown in FIG. 6, FIG. 9, FIG. 10, FIG. 13, and FIG. 14, the second swing member 13 is a ship bottom-shaped resin member having a rectangular shape in a top view with an opening upward. A long hole 13a having a long axis in the left-right direction is provided at a central portion of a bottom surface portion. A pair of prism-shaped engagement portions 13b extending upward are provided at left and right ends of the bottom surface portion. A through-hole 13c penetrating a right side surface of the right side engagement portion 13b and a left side surface of the left side engagement portion 13b is provided in the left-right direction. A pusher pressing portion 13d extending obliquely toward a front lower side is provided on a right side and a left side of the front surface portion, and a pusher pressing portion 13e extending obliquely toward a rear lower side is provided on a right side and a left side of the rear surface portion. The second swing member 13 is attached to the cylindrical portion 15b of the case body 10B so as to insert the pair of projecting portions 15b2 of the cylindrical portion 15b into the pair of through-holes 13c, so that the first swing member 12 can swing about the swing axis A2 in the front-rear direction. The swing axis A2 is an axis extending in the left-right direction common to the pair of projecting portions 15b2 and the pair of through-holes 13c. The second swing member 13 is assembled to the cylindrical portion 15b of the case body 10B when the lower end of the pressing shaft supporting portion 11a of the operation knob 11 is inserted into the long hole 13a. Thus, the operation knob 11 can swing in the front-rear direction with respect to the cylindrical portion 15b of the case body 10B about the swing axis A2 together with the second swing member 13. Here, the swing axis A2 corresponds to a "rotation axis and second rotation axis" in the claims.

Figure 13:
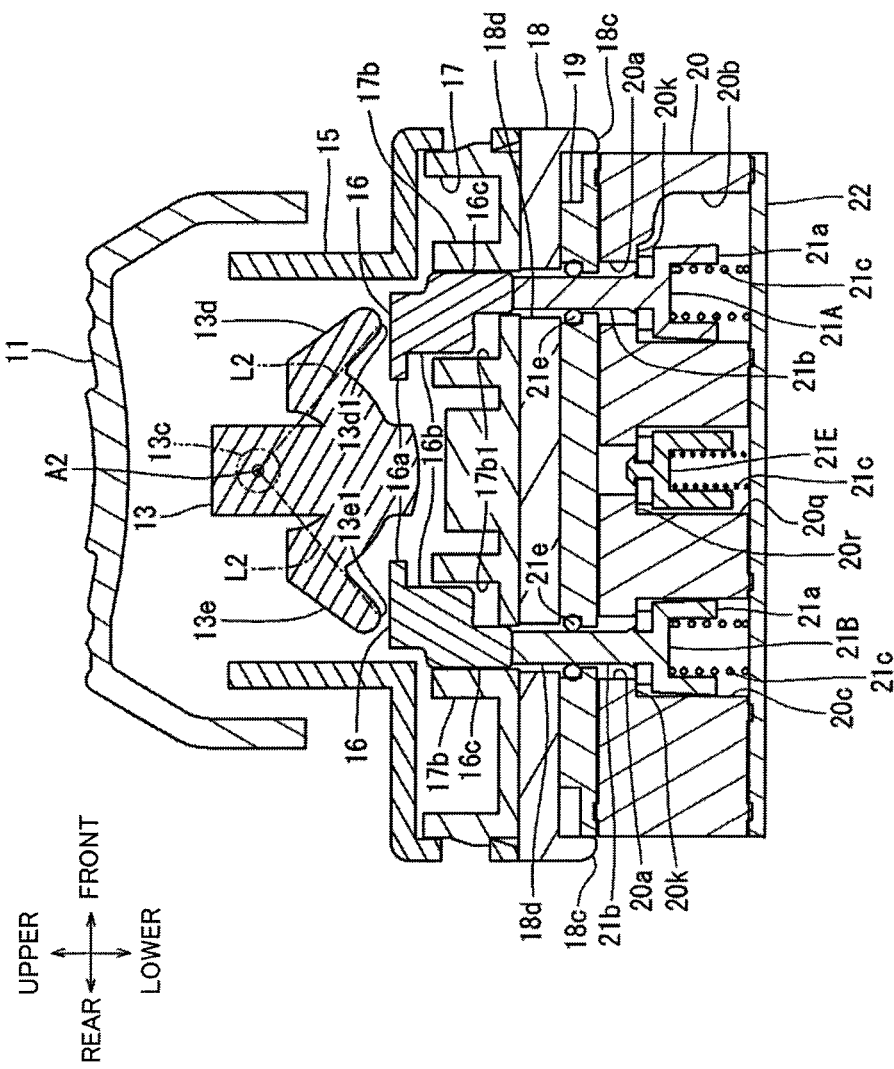
FIG. 13 is a sectional view taken along a line XIII-XIII in FIG. 7.
Figure 14:
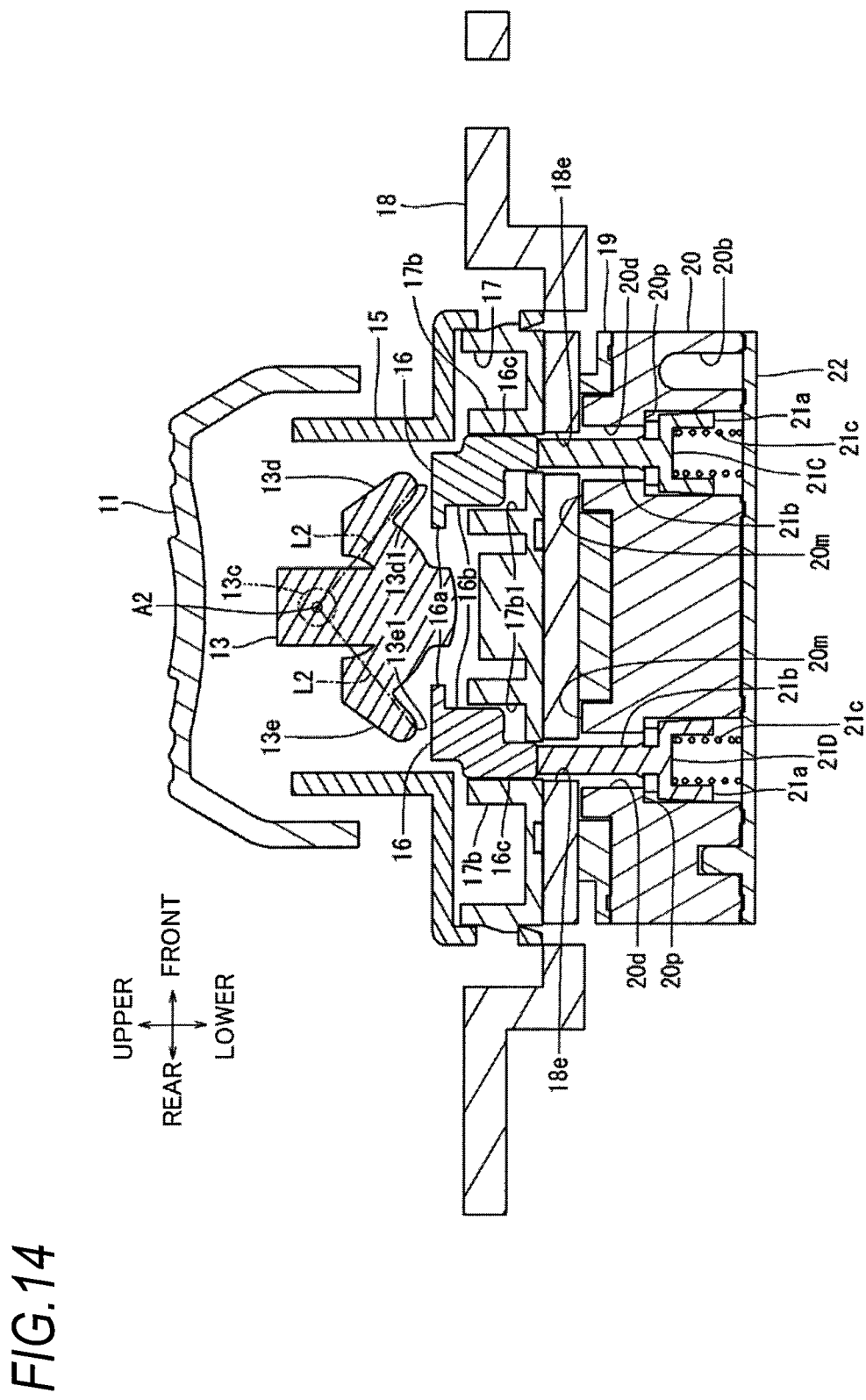
FIG. 14 is a sectional view taken along a line XIV-XIV in FIG. 7.

As shown in FIG. 7, FIG. 13, and FIG. 14, when the second swing member 13 is attached to the case body 10B, the pusher pressing portion 13d extends toward the top plate portion 16a of the pusher 16 corresponding to the valve shaft portion 21b of the air supply valves 21A and the exhaust valve 21C. A distance between the swing axis A2 and a lowest point 13d1 of the pusher pressing portion 13d viewed from the front is L2. Similarly, when the second swing member 13 is attached to the case body 10B, the pusher pressing portion 13e extends toward the top plate portion 16a of the pusher 16 corresponding to the valve shaft portion 21b of the air supply valves 21B and the exhaust valve 21D. A distance between the swing axis A2 and a lowest point 13e1 of the pusher pressing portion 13e viewed from the front is L2. The distance L2 is set to be shorter than the distance L1. Here, the lowest point 13d1 and the lowest point 13e1 each correspond to the "abutment point" in the claims.

As shown in FIG. 6, and FIG. 9 to FIG. 14, the operation knob body 10A, the case body 10B, and the valve body 10C are assembled as follows. As shown in FIG. 11, the valve body 10C is covered with the case body 10B, and engagement claws 20s provided on the left surface portion and the right surface portion of the valve body main body 20 are inserted into and engaged with through-holes 18q provided in the upright wall portion 18a of the third case 18 so as to be fixed without deviation. At this time, the upper ends of the valve shaft portions 21b of the air supply valves 21A and 21B disposed inside the valve body 10C protrude upward through the through-holes 18d of the third case 18. The upper ends of the valve shaft portions 21b of the exhaust valves 21C and 21D disposed inside the valve body 10C protrude upward through the through-holes 18e of the third case 18. Each pusher 16 is disposed to be movable in the upper-lower direction in the through-hole 17b1 of the second case 17, and the respective lower ends of the pressing portions 16c abut on the respective upper ends of the valve shaft portions 21b.

Next, the second swing member 13 and the first swing member 12 are attached, in this order, to the cylindrical portion 15b of the first case 15 of the case body 10B. Specifically, the pair of projecting portions 15b2 of the cylindrical portion 15b is assembled so as to be inserted into the pair of through-holes 13c of the second swing member 13, and the pair of projecting portions 15b1 of the cylindrical portion 15b is assembled so as to be inserted into the pair of through-holes 12b of the first swing member 12. Then, the operation knob 11 to which the pressing shaft 14 is attached via the compression coil spring 14a is attached to the first swing member 12 that is attached to the cylindrical portion 15b. Specifically, the operation knob 11 and the first swing member 12 are assembled such that the pressing shaft supporting portion 11a of the operation knob 11 is passed through the long hole 12a of the first swing member 12 and the long hole 13a of the second swing member 13, and such that the pair of projecting portions 12c of the first swing member 12 are inserted into the pair of through-holes 11b1 of the first swing member supporting wall 11b of the operation knob 11. At this time, a tip of the pressing shaft 14 abuts on a central portion of the spring contact 18m of the third case 18 in a state of being biased from above.

As shown in FIG. 6, FIG. 7, and FIG. 11 to FIG. 14, in a state in which the operation knob body 10A, the case body 10B, and the valve body 10C are assembled, the lowest point 12d1 of the pusher pressing portion 12d of the first swing member 12 is located above the top plate portion 16a of the pusher 16 corresponding to the air supply valves 21A and 21B. In the same state, the lowest point 12e1 of the pusher pressing portion 12e of the first swing member 12 is located above the top plate portion 16a of the pusher 16 corresponding to the exhaust valves 21C and 21D. Further, in the same state, the lowest point 13d1 of the pusher pressing portion 13d of the second swing member 13 is located above the top plate portion 16a of the pusher 16 corresponding to the air supply valve 21A and the exhaust valve 21C. In addition, in the same state, the lowest point 13e1 of the pusher pressing portion 13e of the second swing member 13 is located above the top plate portion 16a of the pusher 16 corresponding to the air supply valve 21B and the exhaust valve 21D.

Actuation of the manual valve device 10 will be described based on FIG. 7 to FIG. 14. In FIG. 7, when the operation portion 11A on the upper surface of the operation knob 11 is pushed down, hold operation in FIG. 2 and FIG. 3 is performed. At this time, in FIG. 9 and FIG. 10, the operation knob 11 rotates about the swing axis A1 so that a right side of the operation knob 11 lowers. Then, a tip of the pressing shaft 14 presses a left side of the spring contact 18m to come into contact with the left contact 18h. Thus, the first wiring 18n and the second wiring 18p are connected to actuate the pump P. At this time, as shown in FIG. 11 and FIG. 12, the pusher pressing portion 12d of the first swing member 12 rotates clockwise about the swing axis A1 to push down the top plate portion 16a of the pusher 16 corresponding to the air supply valves 21A and 21B. Thus, the air supply valves 21A and 21B are pushed down. The first flow passage 20a and the second flow passage 20b are opened by the air supply valve 21A. The first flow passage 20a and the third flow passage 20c are opened by the air supply valve 21B. Air is supplied from the pump P to both the upper air bag 4a and the lower air bag 4b. At this time, since the lowest point 12d1 of the pusher pressing portion 12d rotates in a radius L1 about the swing axis A1, a stroke amount of the valve shaft portion 21b increases compared with a case of rotating in a radius L2, in other words, a pressing operation speed increases, and an air flow rate per unit time increases.

In FIG. 7, when the operation portion 11B on the upper surface of the operation knob 11 is pushed down, release operation in FIG. 2 and FIG. 3 is performed. At this time, in FIG. 9 and FIG. 10, the operation knob 11 rotates about the swing axis A1 so that a left side of the operation knob 11 lowers. Then, a tip of the pressing shaft 14 presses a right side of the spring contact 18m to come into contact with the right contact 18k. Thus, the first wiring 18n and the second wiring 18p are not connected, and the pump P is not actuated. At this time, as shown in FIG. 11 and FIG. 12, the pusher pressing portion 12e of the first swing member 12 rotates counterclockwise about the swing axis A1 to push down the top plate portion 16a of the pusher 16 corresponding to the exhaust valves 21C and 21D. Thus, the exhaust valves 21C and 21D are pushed down. The third flow passage 20c and the exhaust port 20d are opened by the exhaust valve 21C. The second flow passage 20b and the exhaust port 20d are opened by the exhaust valve 21D. Then, air is discharged from both the upper air bag 4a and the lower air bag 4b. At this time, since the lowest point 12e1 of the pusher pressing portion 12e rotates in a radius L1 about the swing axis A1, a stroke amount of the valve shaft portion 21b increases compared with a case of rotating in a radius L2, in other words, a pressing operation speed increases, and an air flow rate per unit time increases.

In FIG. 7, when the operation portion 11C on the upper surface of the operation knob 11 is pushed down, up operation in FIG. 2 and FIG. 3 is performed. At this time, in FIG. 9 and FIG. 10, the operation knob 11 rotates about the swing axis A2 so that a front side of the operation knob 11 lowers. Then, a tip of the pressing shaft 14 presses a lower side of the spring contact 18m to come into contact with the rear contact 18g. Thus, the first wiring 18n and the second wiring 18p are connected to actuate the pump P. At this time, as shown in FIG. 13 and FIG. 14, the pusher pressing portion 13d of the first swing member 13 rotates clockwise about the swing axis A2 to push down the top plate portion 16a of the pusher 16 corresponding to the air supply valves 21A and the exhaust valve 21C. Thus, the air supply valve 21A and the exhaust valve 21C are pushed down. The first flow passage 20a and the second flow passage 20b are opened by the air supply valve 21A. The third flow passage 20c and the exhaust port 20d are opened by the exhaust valve 21C. Then, air is supplied from the pump P to the upper air bag 4a, and air is discharged from the lower air bag 4b. At this time, since the lowest point 13d1 of the pusher pressing portion 13d rotates in a radius L2 about the swing axis A2, a stroke amount of the valve shaft portion 21b decreases compared with a case of rotating in a radius L1, in other words, a pressing operation speed decreases, and an air flow rate per unit time decreases. Thus, the upper air bag 4a slowly inflates, and the lower air bag 4b slowly contracts.

In FIG. 7, when the operation unit 11D on the upper surface of the operation knob 11 is pushed down, down operation in FIG. 2 and FIG. 3 is performed. At this time, in FIG. 9 and FIG. 10, the operation knob 11 rotates about the swing axis A2 so that a rear side of the operation knob 11 lowers. Then, a tip of the pressing shaft 14 presses an upper side of the spring contact 18m to come into contact with the front contact 18f. Thus, the first wiring 18n and the second wiring 18p are connected to actuate the pump P. At this time, as shown in FIG. 13 and FIG. 14, the pusher pressing portion 13e of the first swing member 13 rotates counterclockwise about the swing axis A2 to push down the top plate portion 16a of the pusher 16 corresponding to the air supply valves 21B and the exhaust valve 21D. Thus, the air supply valve 21B and the exhaust valve 21D are pushed down. The first flow passage 20a and the third flow passage 20c are opened by the air supply valve 21B. The second flow passage 20b and the exhaust port 20d are opened by the exhaust valve 21D. Then, air is supplied from the pump P to the lower air bag 4b, and air is discharged from the upper air bag 4a. At this time, since the lowest point 13e1 of the pusher pressing portion 13e rotates in a radius L2 about the swing axis A2, a stroke amount of the valve shaft portion 21b decreases compared with a case of rotating in a radius L1, in other words, a pressing operation speed decreases, and an air flow rate per unit time decreases. Thus, the lower air bag 4b slowly inflates, and the upper air bag 4a slowly contracts.

The present embodiment configured as described above achieves the following operation effects. When the operation portion 11A or the operation portion 11B on the upper surface of the operation knob 11 is pushed down, the air supply valves 21A and 21B or the exhaust valves 21C and 21D are pressed by the pusher pressing portions 12d and 12e of the first swing member 12 at a large stroke amount (speed). Thus, both the upper air bag 4a and the lower air bag 4b inflate or contract quickly, and the lumbar region of the seated occupant can be quickly pressed or released. When the operation portion 11C or the operation portion 11D on the upper surface of the operation knob 11 is pushed down, the air supply valve 21A and the exhaust valve 21C or the air supply valve 21B and the exhaust valve 21D are pressed by the pusher pressing portions 13d and 13e of the second swing member 13 in a small stroke amount (speed). Thus, both the upper air bag 4a and the lower air bag 4b inflate or contract slowly, and the lumbar region of the seated occupant can be slowly pressed or released. That is, both the upper air bag 4a and the lower air bag 4b are inflated or contracted quickly, and one of the upper air bag 4a and the lower air bag 4b can be inflated slowly while the other can be contracted slowly. Therefore, pressing the lumbar region of the seated occupant can be adjusted more comfortably.

Adjustment of the pressing operation speed of the air supply valves 21A and 21B and the exhaust valves 21C and 21D can be performed by setting the distance between the swing axis A1 and the lowest point 12d1 or the lowest point 12e1 of the first swing member 12 to L1 and by setting the distance between the swing axis A2 and the lowest point 13d1 or the lowest point 13e1 of the second swing member 13 to L2. Thus, opening and closing speeds of the air supply valves 21A and 21B and the exhaust valves 21C and 21D can be changed individually or by combination with a simple structure. Further, since the swing axis A1 and the swing axis A2 are orthogonal to each other, the opening and closing speeds of the air supply valves 21A and 21B and the exhaust valves 21C and 21D can be changed individually or by combination by making a tilting direction of the operation knob 11 different by 90 degrees.

Although a specific embodiment has been described above, the present invention is not limited to the appearance and configuration thereof, and various modifications, additions, and deletions may be made without departing from the scope of the invention. Examples thereof include the following.

1. In the above embodiment, the pusher pressing portion 12d and the pusher pressing portion 12e of the first swing member 12 have the same length, and the distance between the swing axis A1 and the lowest point 12d1 and the distance between the swing axis A1 and the lowest point 12e1 are set to be the same. However, the present disclosure is not limited to this. The distance between the swing axis A1 and the lowest point 12d1 and the distance between the swing axis A1 and the lowest point 12e1 can be made different by changing the lengths of the pusher pressing portion 12d and the pusher pressing portion 12e. When set in this manner, a speed of air supply in the hold operation and a speed of exhaust in the release operation can be made different from each other. Similarly, the distance between the swing axis A2 and the lowest point 13d1 and the distance between the swing axis A2 and the lowest point 13e1 can be made different by changing the lengths of the pusher pressing portion 13d and the pusher pressing portion 13e of the second swing member 13. When set in this manner, a speed of air supply and exhaust in the up operation and a speed of air supply and exhaust in the down operation can be made different from each other. When the above change is made, it may become necessary to change the shape of the top plate portion 16a of the pusher 16.

2. In the above embodiment, the air bag is applied as a lumbar support of an automobile seat, but may be applied to a lumbar support of a seat mounted on an airplane, a ship, a train, or the like. Furthermore, the air bag may be used as an actuator other than the lumbar support.

The disclosure provides illustrative, non-limiting examples as follows:

A first aspect of the present disclosure is a manual valve device including: a plurality of air bags provided inside a vehicle seat; a valve main body including a plurality of flow passages, the plurality of flow passages communicating with the plurality of air bags, respectively, so as to allow air to flow; a plurality of valve bodies movable inside the valve main body so as to open and close the plurality of flow passages, respectively; a plurality of valve shafts coupled to the plurality of valve bodies, respectively, and configured to be manually operated from an outside of the valve main body to move the plurality of valve bodies in a stroke; and an operation lever configured to press any one of the plurality of valve shafts or any combination of the plurality of valve shafts in an axial direction by being tilted with respect to the valve main body, and in which the operation lever includes an adjustment mechanism configured to adjust an air flow rate per unit time flowing in the plurality of flow passages by changing a stroke amount in the axial direction, the stroke amount being an amount in which any one of the plurality of valve shafts or any combination of the plurality of valve shafts is pressed so as to move in the stroke by tilting of the operation lever.

According to the first aspect, opening and closing speeds of the valve bodies can be changed individually or by combination by the adjustment mechanism. Thus, a speed at which each of the plurality of air bags is inflated or contracted can be adjusted, and a method of pressing the lumbar region of the seated occupant can be adjusted more comfortably when the air bag is applied to the lumbar support, for example.

A second aspect of the disclosure is characterized in that in the first aspect, the valve main body includes: a flat plate-shaped base body having a groove that forms the plurality of flow passages; and a cover fixed so as to close an opening side of the groove of the base body, and the operation lever is provided to the base body to be tiltable about a rotation axis, the rotation axis extending in parallel to an in-plane direction of the base body and passing through the operation lever, and the adjustment mechanism is configured such that, when viewed from an out-of-plane direction of the base body, a distance from the rotation axis to an abutment point of the operation lever on the valve shaft is changed.

According to the second aspect, by changing the distance from the rotation axis to the abutment point of the operation lever on the valve shaft, the stroke amount of the valve body in the axial direction increases as the distance is longer when the operation lever is tilted. Thus, the opening and closing speeds of the valve bodies can be changed individually or by combination with a simple structure.

A third aspect of the disclosure is characterized in that in the second aspect, the rotation axis has a first rotation axis and a second rotation axis orthogonal to the first rotation axis, and when viewed from the out-of-plane direction of the base body, a distance from the first rotation axis to the abutment point of the operation lever on the valve shaft is longer than a distance from the second rotation axis to the abutment point of the operation lever on the valve shaft.

According to the third aspect, the stroke amount in the axial direction of the valve body operated when the operation lever is tilted with respect to the valve main body about the first rotation axis can be larger than the stroke amount in the axial direction of the valve body operated when the operation lever is tilted with respect to the valve main body about the second rotation axis. Thus, the opening and closing speeds of the valve bodies can be changed individually or by combination depending on a tilting direction of the operation lever.

A fourth aspect of the disclosure is characterized in that in any one of the first aspect to the third aspect, the operation lever interlockingly operates a switch configured to be operated to be in ON-state and OFF-state so as to actuate a pump for supplying air to the plurality of air bags.

According to the fourth aspect, the ON-state and the OFF-state of the pump can be operated and interlocked by the operation of the operation lever so as to be simple.

A fifth aspect of the disclosure is characterized in that in any one of the first aspect to the fourth aspect, the plurality of air bags function as lumbar supports.

According to the fifth aspect, by controlling the air flow rate per unit time to be supplied and exhausted in the plurality of air bags, pressing of the lumbar region of the seated occupant can be adjusted more comfortably.

What is claimed is:

1. A manual valve device comprising:
a plurality of air bags provided inside a vehicle seat;
a valve main body including a plurality of flow passages, the plurality of flow passages communicating with the plurality of air bags, respectively, so as to allow air to flow;
a plurality of valve bodies movable inside the valve main body so as to open and close the plurality of flow passages, respectively;
a plurality of valve shafts coupled to the plurality of valve bodies, respectively, and configured to be manually operated from an outside of the valve main body to move the plurality of valve bodies in a stroke; and
an operation lever configured to press any one of the plurality of valve shafts or any combination of the plurality of valve shafts in an axial direction by being tilted with respect to the valve main body,
wherein the operation lever includes an adjustment mechanism configured to adjust an air flow rate per unit time flowing in the plurality of flow passages by changing a stroke amount in the axial direction, the stroke amount being an amount in which any one of the plurality of valve shafts or any combination of the plurality of valve shafts is pressed so as to move in the stroke by tilting of the operation lever.

2. The manual valve device according to claim 1,
wherein the valve main body includes:
a flat plate-shaped base body having a groove that forms the plurality of flow passages; and
a cover fixed so as to close an opening side of the groove of the base body,
wherein the operation lever is provided to the base body to be tiltable about a rotation axis, the rotation axis extending in parallel to an in-plane direction of the base body and passing through the operation lever, and
wherein the adjustment mechanism is configured such that, when viewed from an out-of-plane direction of the base body, a distance from the rotation axis to an abutment point of the operation lever on the valve shaft is changed.

3. The manual valve device according to claim 2,
wherein the rotation axis has a first rotation axis and a second rotation axis orthogonal to the first rotation axis, and
wherein, when viewed from the out-of-plane direction of the base body, a distance from the first rotation axis to the abutment point of the operation lever on the valve shaft is longer than a distance from the second rotation axis to the abutment point of the operation lever on the valve shaft.

4. The manual valve device according to claim 1,
wherein the operation lever interlockingly operates a switch configured to be operated to be in ON-state and OFF-state so as to actuate a pump for supplying air to the plurality of air bags.

5. The manual valve device according to claim 1,
wherein the plurality of air bags function as lumbar supports.

* * * * *